United States Patent [19]

DiGiovanni

[11] Patent Number: 5,291,377
[45] Date of Patent: Mar. 1, 1994

[54] SCHEMATIC PATCH PANEL

[76] Inventor: Thomas H. DiGiovanni, 11 Earth Star Pl., Gaithersburg, Md. 20878

[21] Appl. No.: 815,156

[22] Filed: Dec. 31, 1931

[51] Int. Cl.[5] .............................................. H02B 1/20
[52] U.S. Cl. .................................... 361/826; 361/601; 439/491; 439/536; 439/43
[58] Field of Search ......................... 439/43, 491, 536; 361/393, 394, 352, 346, 332, 428, 424; 248/906

[56] References Cited

U.S. PATENT DOCUMENTS

| | | | |
|---|---|---|---|
| 2,507,744 | 5/1950 | Welch | 361/332 |
| 3,308,347 | 3/1967 | Klaiber . | |
| 3,631,374 | 12/1971 | Cartelli | 361/352 |
| 3,809,966 | 5/1974 | Tirrell et al. | 361/332 |
| 4,451,108 | 5/1984 | Skidmore | 439/536 |
| 4,563,053 | 1/1986 | Pavel | 439/43 |
| 4,835,659 | 5/1989 | Goodson . | |

FOREIGN PATENT DOCUMENTS 1245433  7/1967  Fed. Rep. of Germany ...... 361/352

Primary Examiner—Paula A. Bradley
Attorney, Agent, or Firm—Jacobson, Price, Holman & Stern

[57] ABSTRACT

A schematic patch panel includes an enlargement of a customer's floor plan that is dry mounted to a piece of ¼ foamcore board or located on a plate, preferably by printing. The board is mounted in a frame that can be configured with a clear, locking cover for security purposes. The entire assembly is mounted on the customer's wall by brackets. At each of the computer wall outlet locations depicted on the dry mounted floor plan, a double-sided RJ-45 panel jack is inserted through the floor plan. These panel jacks snap into the floor plan, requiring no other means of fastening. Any wall outlet depicted on the schematic patch panel is activated by connecting a telephone-type extension cable between the network central controller and that wall outlet icon. By this transfer, a different unshielded twisted pair cable connection line is activated and the individualized identifiers and other information particular to a certain terminal are also transferred.

15 Claims, 1 Drawing Sheet

SCHEMATIC PATCH PANEL

FIELD OF THE INVENTION

The present invention includes a graphically oriented patch panel for making network connections. Non-technical and non-computer literate personnel are enabled to connect a user to a network as if they were plugging in a telephone.

BACKGROUND OF THE INVENTION

Network patch panels have been used sparingly for years as a method of distributing network connections from a central point to branch locations throughout a building. Available patch panels are non-intuitive, in that they contain a series of up to 24 jacks per bank, assembled horizontally, with no reference as to the actual location (neither wall jack nor room) of the connected jack. (See FIG. 1).

Generally, only larger companies had the financial and technical resources available to use patch panel technology to take advantage of centrally administered network connections. Central administration of network connections allows cost and time effective monitoring of network activities, central point activation/-deactivation of network users and eliminates the possibility of a user unplugging their computer from the network cabling and deactivating all users connected further down the line.

Typically, a company may wire their building for computer locations far exceeding their current staffing and/or computer systems resources in anticipation of future growth or with the knowledge that systems will be moved frequently from one location to another. It is not uncommon to have upwards of 250 wired jack locations throughout a company, yet have only 50 computer systems that will be connected to the network. Because typical network support hardware is configured in multiples of 10 to 12 users, the company with 250 wired locations but only 50 computers will purchase 5 network hubs (50 computers, divided by 10 ports per hub). Should any of the users need to be moved to another wired location within the building, it is more cost effective to "repatch" that user on the patch panel, than to purchase an additional hub at $1500 to $2000.

Expensive coaxial cable has typically been necessary to make network connections. The added expense of making a central-point to user location cable drop connection for every user, as opposed to a point-to-point, chain type of wiring plan, usually prohibited the use of network patch panels.

With the development of network components that can use inexpensive, Unshielded Twisted Pair (UTP) cable (telephone-type wiring) the Central Point To User wiring scheme has become a cost-effective reality. According to *LAN Times*, 10Base T is the fastest growing cable scheme in use today. "Anyone contemplating cabling with coaxial cable instead of UTP using 10Base T technology is asking for trouble. 10Base T is easier to install, easier to maintain and offers superior management capabilities."

Freestanding computers are being networked together at an exponential rate, as companies realize the benefit of sharing the resources and information they currently have. The cabling scheme of choice is Unshielded Twisted Pair, because it is inexpensive, widely available and easy to install.

SUMMARY OF THE INVENTION

The present invention includes all of the positive features of traditional patch panels, yet retains none of the negative features. Some of the advantages obtained by the present invention are: (1) central administration of network connections, (2) centralized monitoring of network resources, (3) cost-effective use of other network hardware, (4) intuitive interface between user and network, (5) easy to relocate computer resources within a building, and (6) not network specific.

The schematic patch panel of the present invention includes an enlargement of a customer's floor plan that is dry mounted to a piece of ¼ inch foam-core board or printed on a plate, preferably of metal, and most preferably of aluminum. The board is mounted in a frame that can be configured with a clear, locking cover for security purposes. The entire assembly is mounted on the customer's wall by brackets.

At each of the computer wall outlet locations depicted on the floor plan, a double-sided RJ-45 panel jack is inserted through the foam core (RJ-45 receptacles are industry standard connections for UTP cabling) or into openings of a metal plate. These panel jacks snap into the foam core, requiring no other means of fastening, or are secured within an opening of a metal plate by a snap-fit.

Various sizes of the finished schematic patch panel will be available, depending on the actual size of the customer's building site. The overall scale of the floor plan will generally be ¼ inch=1 foot. This translates to a finished size of 25 inches by 38 inches for an actual 100 by 150 foot building site. A panel of this size is visually pleasing and easy to manipulate.

Each schematic patch panel is custom designed and fabricated to meet the specifications of each customer. A schematic of a customer's building site is based on a copy of the floor plan of their location. The floor plan can be: an architect's blue print or rendering, a builder rendering or floor plan, a hand drawn sketch of the floor plan, or a computer generated floor plan, either hard copy or disk-based. These floor plans will include the actual image of the client site, the locations of all computer connections in each room and the location of the network file server and patch panel.

The supplied plan is used to generate a computer image of the customer's floor plan that will ultimately serve as artwork for the full size schematic patch panel. In the case of hand drawn sketches, a computer floor plan will be generated.

A printout of the computer image will be returned to the customer for approval and sign-off. Most new construction is plagued by last minute changes in room dimensions, wall outlet locations and the actual number of wall outlet locations. (Room dimensions usually do not change within 10 days of building turnover; however, wall outlet locations and numbers can change up to and even after building turnover.)

Because of the inherent flexibility of the schematic patch panel of the invention, additions to the number of wall outlet locations can be made up to the time of shipment and additions of UTP cabling made after installation of the schematic patch panel are easily implemented by the customer.

Any wall outlet depicted on the schematic patch panel is activated by connecting a telephone-type extension cable between the network central controller and that wall outlet icon. By this transfer, a different UTP cable connection line is activated and the individualized identifiers and other information particular to a certain terminal are also transferred.

Any company in the 10 to 250 user range, regardless of the type of company or market affiliation would be interested in this product. This includes companies that are planning the installation of a new network, as well as those who already have a network that are in a position to upgrade their network or planning on moving to new facilities.

Therefore, if someone were to change locations within an office floor plan included on the schematic patch panel of the present invention, the telephone-type extension cable between a network central controller and the RJ-45 panel jack extending through the schematic floor diagram illustrative of a specific location where the user is presently located can be changed by removing the extension cable connected to the network central controller from the schematic patch panel and reinserting the extension cable to the RJ-45 panel jack connector at another location on the schematic patch panel representative of the new location of the user.

By this process, anyone is able to maintain a local area network intact without the need of an on-site computer literate person or requiring calling in of outside technical experts to arrange for the relocating of an individual within an office complex. Shifts in personnel are thereby easily accomplished with minimal downtime.

It is an object of the present invention to provide a schematic patch panel illustrative of a floor plan of a local area network.

It is another object of the present invention to provide a schematic patch panel illustrative of a floor plan of a local area network with panel jacks located on the schematic patch panel at a location representative of a location of a terminal of a network user.

It is yet another object of the present invention to provide a schematic patch panel illustrative of a floor plan of a local area network with panel jacks located on the schematic patch panel at a location representative of a location of a terminal of a network user with changes of location in personnel being easily accomplished by shifting a panel jack from a location indicative of a present location to another location schematically illustrated by the patch panel of the present invention.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

Figure 1:
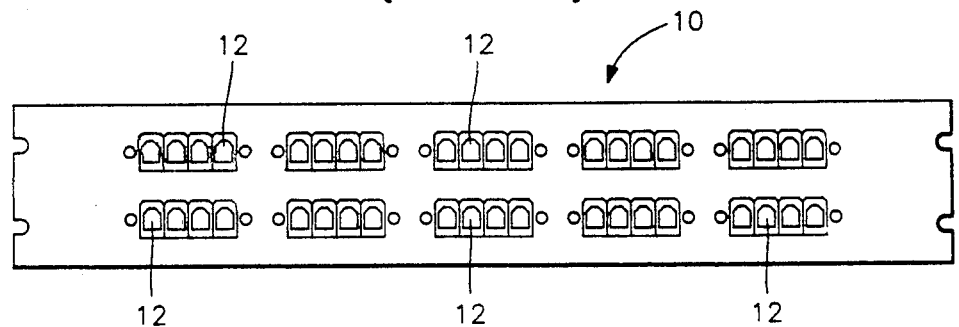
FIG. 1 is a front perspective view of a prior art patch panel.

In describing a preferred embodiment of the invention illustrated in the drawings, specific terminology will be resorted to for the sake in clarity. However, the invention is not intended to be limited to the specific terms so selected, and it is to be understood that each specific term includes all technical equivalents which operate in a similar manner to accomplish a similar purpose.

In FIG. 1, a conventional patch panel 10 includes a series of jacks 12 assembled horizontally. These jacks are connected by cable to various remote locations. No reference to the actual location of a terminal to which the jack relates is provided.

Figure 2:
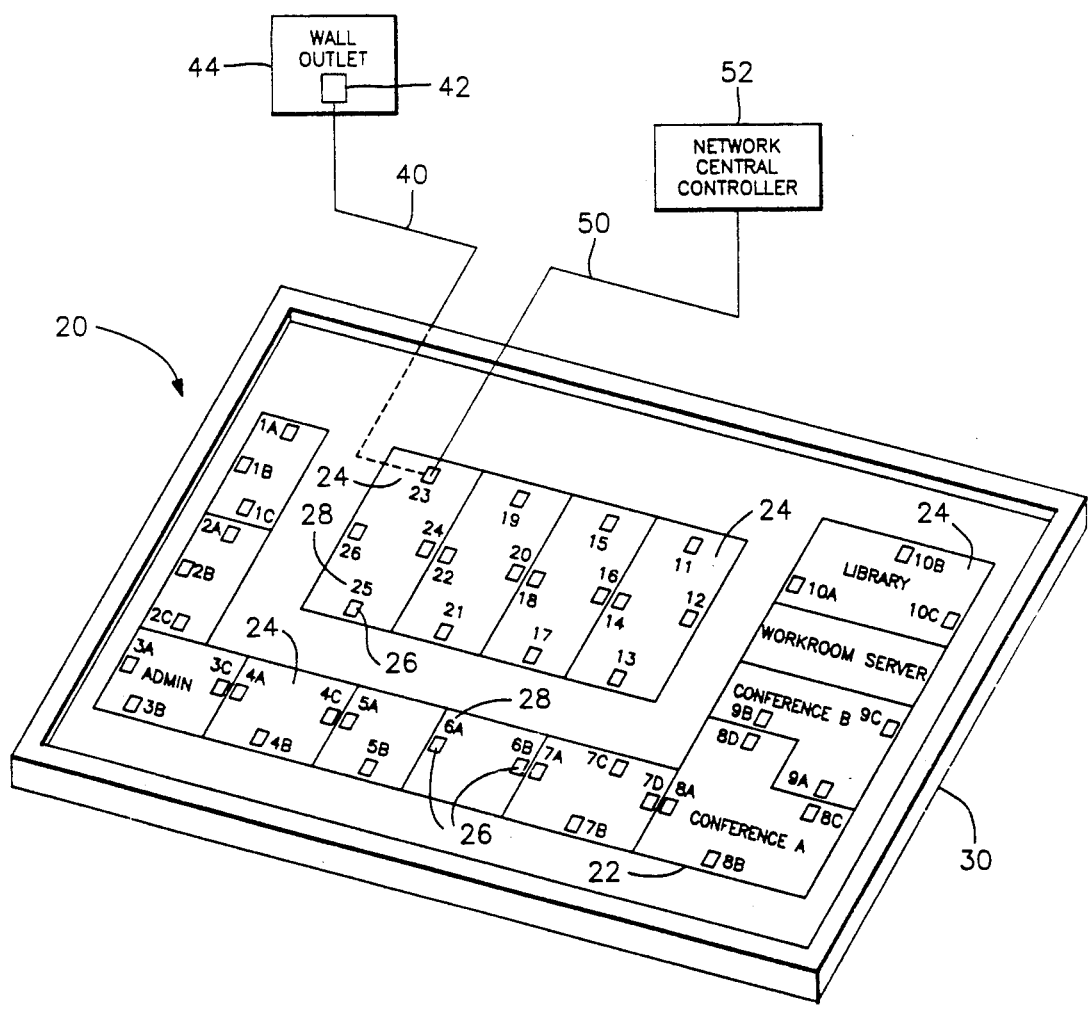
FIG. 2 is a perspective view of a schematic patch panel illustrative of the present invention.

With reference to FIG. 2, a schematic patch panel embodying the teachings of the subject invention is generally designated as 20. The schematic patch panel 20 includes a schematic diagram 22 of a customer's office floor plan. A plurality of rooms 24 representative of actual rooms at an office are arranged in the exact corresponding location to the actual rooms of the floor plan 22 as exist at the job site. In each of the rooms 24 are a plurality of RJ-45 panel jack boxes 26, representative of wall outlets, which each have identifying indicia 28.

Typically, the office jobsite is pre-wired with UTP cable 40 between each possible connection point in the actual rooms of the jobsite and the schematic patch panel. At both ends of the UTP cable are RJ-45 panel jacks. One RJ-45 panel jack 42 of each cable line 40 is mounted in a wall of an office with the opposite end, RJ-45 panel jack inserted at the appropriate corresponding box 26 location, through the schematic diagram 22.

Each RJ-45 panel jack box 26 is representative of a wall outlet 44 in each room as represented by the schematic diagram 22 at the approximate location in which the wall outlet 44 actually is installed in the room corresponding to the floor plan. Accordingly, if three RJ-45 panel jack boxes 26 are shown in a room, the room which corresponds to the floor plan will also have three wall outlets 44 to which three lines of unshielded twisted pair cable 40 are connected in the actual room and which is cabled to the location of the schematic patch panel 20.

The unshielded twisted pair cable 40 is connected to an RJ-45 panel jack which is inserted from the rear of the schematic patch panel 20 so as to protrude through a RJ-45 panel jack box 26 which corresponds to the actual location of the wall outlet 44 located at the opposite end of the cable 40 to which the RJ-45 panel jack is connected. A telephone-type extension cable 50 is then inserted into the RJ-45 panel jack located at a wall outlet icon RJ-45 panel jack box 26 to form a connection with a network central controller 52 only for the locations at which terminals are connected at the corresponding office location. By this connection, UTP cable lines 40 are activated for only the RJ-45 panel jack boxes 26 which are indicative of cable lines to terminals in the offices, connected to the network central controller 52 by telephone-type extension cable 50.

If an individual were to change offices, for instance, from the location represented by box 10C of the "Library" in FIG. 2, to the Conference Room A and they wanted to locate their computer terminal at location 8A, the telephone type extension cable 50 connected to the network central controller 52 would be moved from box 10C to box 8A to activate the UTP cable 40 connected to the location representative of box 8A. The computer terminal of the individual would then be connected to the actual wall outlet 44 in the Conference Room A on the wall which corresponds to the floor plan at the location labelled 8A so as to reconnect to the activated cable line, now connected to the network central controller 52.

The floor plan 22 may be dry mounted onto a ¼ inch foam core board. The foam core board with the overlaying floor plan would then be enclosed within a frame 30 and optionally have a transparent cover mounted on top of the frame 30, which could be locked, for security purposes. The composition of the foam core board is such that an RJ-45 panel jack box 26 can be inserted into the board from its rear and be held in place due to the compressibility of the board.

Alternatively, a metal plate, preferably of aluminum and having a thickness of approximate 0.030 inches can be imprinted or screened with the floor plan 22. An RJ-45 panel jack would be located at holes formed at each RJ-45 panel jack box 26 and be secured in place in the plate by a snap-fit of the panel jack in the opening at RJ-45 panel jack box 26. The plate may be plastic, phenolic or other material capable of sustaining its shape, securely holding the panel jacks and will allow the application of a floor plan, whether screened, dry mounted, etched or painted.

Having described the invention, many modifications thereto will become apparent to those skilled in the art to which it pertains without deviation from the spirit of the invention as defined by the scope of the appended claims.

I claim:

1. A patch panel for a local area network of an office site, said patch panel comprising:
  a floor plan representative of an office site,
  a plurality of indicators on said floor plan at a location representative of a location of a wall outlet which is the terminus for a cable line for a computer terminal of the local area network at the office site, and
  means for retaining a connector at an opposite terminus of the cable line at each of said plurality of indicators so that while a connector is retained, a connection can be made by an extension cable between the connector and a network central controller to activate a particular cable line and thereby the computer terminal connected to the particular cable line.

2. A patch panel as claimed in claim 1, wherein said floor plan is located on a plate.

3. A patch panel as claimed in claim 1, wherein said means for retaining a connector includes a foam-core board.

4. A patch panel as claimed in claim 3, wherein said floor plan is secured to said foam-core board.

5. A local area network of computer terminals, said local area network comprising:
  a network central controller,
  a patch panel including a floor plan having marked locations representative of wall outlets,
  a plurality of wall outlets for connection of a computer terminal to said patch panel,
  cable lines interconnecting said plurality of wall outlets to a corresponding marked location on said floor plan of said patch panel representative of a location of each wall outlet,
  a connector at each end of each of said cable lines located at said wall outlets and said patch panel, and
  a cable extension connected between said network central controller and said connector at said patch panel of said cable lines to be activated so that upon connection by a computer terminal with a wall outlet at a connector of an activated cable line, said computer terminal will be networked with said network central controller.

6. A local area network as claimed in claim 5, wherein said cable lines are unshielded twisted pair cables.

7. A local area network as claimed in claim 5, wherein said connector is a panel jack.

8. A local area network as claimed in claim 5, wherein said floor plan is located on a plate.

9. A local area network as claimed in claim 5, wherein said patch panel includes means for retaining said connector at said marked locations.

10. A local area network as claimed in claim 9, wherein said means for retaining said connector includes a foam-core board.

11. A local area network as claimed in claim 10, wherein said floor plan is secured to said foam-core board.

12. A patch panel for connecting a network central controller and a plurality of computer terminals, said patch panel comprising:
  a floor plan representative of a site having a computer network,
  a plurality of indicators on said floor plan representative of a location for positioning a computer terminal of the computer network, and
  means for retaining a connector at the indicators on the floor plan so that a connection may be made between the network central controller and the plurality of computer terminals.

13. A patch panel as claimed in claim 12, wherein said floor plan is located on a plate.

14. A patch panel as claimed in claim 12, wherein said means for retaining a connector includes a foam-core board.

15. A patch panel as claimed in claim 14, wherein said floor plan is secured to said foam-core board.

* * * * *